US012467286B2

(12) United States Patent
Caperton, IV

(10) Patent No.: US 12,467,286 B2
(45) Date of Patent: Nov. 11, 2025

(54) DRAWER INTERLOCK SYSTEMS FOR FURNITURE

(71) Applicant: Caperton Furnitureworks, LLC, Berkeley Springs, WV (US)

(72) Inventor: William Gaston Caperton, IV, Berkeley Springs, WV (US)

(73) Assignee: Caperton Furnitureworks, LLC, Berkeley Springs, WV (US)

( * ) Notice: Subject to any disclaimer, the term of this patent is extended or adjusted under 35 U.S.C. 154(b) by 67 days.

(21) Appl. No.: 18/588,133

(22) Filed: Feb. 27, 2024

(65) Prior Publication Data

US 2024/0328209 A1 Oct. 3, 2024

Related U.S. Application Data

(60) Provisional application No. 63/455,307, filed on Mar. 29, 2023.

(51) Int. Cl.
*E05B 65/466* (2017.01)

(52) U.S. Cl.
CPC .................................. *E05B 65/466* (2013.01)

(58) Field of Classification Search
CPC .... E05B 65/462; E05B 65/463; E05B 65/465; E05B 65/466; A47B 88/50; A47B 2210/0086; A47B 2097/008
See application file for complete search history.

(56) References Cited

U.S. PATENT DOCUMENTS 1,139,939 A * 5/1915 Westmoreland ...... E05B 65/462 312/220
1,421,563 A * 7/1922 Raggio ................. E05B 65/462 312/333
2,810,616 A * 10/1957 Mcclellan ............... E05B 65/46 292/DIG. 68
2,842,419 A * 7/1958 Howard ................ E05B 65/465 292/216
2,882,112 A * 4/1959 Jarvi ..................... E05B 65/462 312/333

(Continued)

FOREIGN PATENT DOCUMENTS

DE 202019104752 U1 * 12/2020 ............. A47B 97/00
SE 1650028 A1 * 12/2016 ............. E05B 65/46

(Continued)

*Primary Examiner* — Andrew Roersma

(74) *Attorney, Agent, or Firm* — Womble Bond Dickinson (US) LLP

(57) ABSTRACT

A drawer locking system includes a support strap, a lock plate, and a lock hook. The lock plate is configured to mount to a locking rail of a piece of furniture. A lock hook is pivotally mounted to the lock plate and includes a body that has a first end portion and a second end portion. The lock hook has a locked configuration in which the first end portion is configured to engage a drawer to prevent the drawer from moving from a closed position towards an open position thereof. The lock hook has an unlocked configuration in which the first end portion is configured to disengage the drawer to allow the drawer to move from the closed position towards the open position. The second end portion is engaged with the support strap such that the support strap pivots the lock hook from the locked configuration to the unlocked configuration.

12 Claims, 9 Drawing Sheets

(56) References Cited

U.S. PATENT DOCUMENTS

| | | | | | |
|---|---|---|---|---|---|
| 2,886,392 | A * | 5/1959 | Stegmaier | E05B 65/462 292/196 |
| 3,323,849 | A * | 6/1967 | Stark | E05B 65/463 312/333 |
| 3,401,998 | A * | 9/1968 | Evans | E05B 65/465 312/215 |
| 3,560,068 | A * | 2/1971 | Ostrom | E05B 65/468 312/217 |
| 3,881,793 | A * | 5/1975 | Anderson | E05B 65/465 312/276 |
| 3,883,200 | A * | 5/1975 | Latham | E05B 65/463 312/216 |
| 3,957,324 | A * | 5/1976 | Klenik, Jr. | E05B 65/463 312/217 |
| 4,705,326 | A * | 11/1987 | Craig | E05B 65/468 312/216 |
| 5,074,627 | A * | 12/1991 | Broeders | E05B 65/464 312/221 |
| 5,176,436 | A * | 1/1993 | Mitchell | E05B 65/466 312/217 |
| 5,199,774 | A | 4/1993 | Hedinger et al. | |
| 6,220,562 | B1 | 4/2001 | Konkle | |
| 6,409,290 | B1 * | 6/2002 | Lin | E05B 65/462 312/219 |
| 9,777,513 | B2 * | 10/2017 | Muller | A47B 88/477 |
| 10,835,038 | B2 | 11/2020 | Johannesson | |
| 2008/0157642 | A1 * | 7/2008 | Liu | B25H 3/028 312/334.1 |
| 2013/0087675 | A1 | 4/2013 | Miller | |
| 2019/0365098 | A1 * | 12/2019 | Johannesson | E05B 65/46 |
| 2025/0019999 | A1 * | 1/2025 | Lampei | A47B 97/00 |

FOREIGN PATENT DOCUMENTS

| | | | | |
|---|---|---|---|---|
| WO | WO2022132006 | | 6/2022 | |
| WO | WO-2023229513 | A1 * | 11/2023 | E05B 65/463 |
| WO | WO-2024128957 | A1 * | 6/2024 | E05B 65/463 |

* cited by examiner

DRAWER INTERLOCK SYSTEMS FOR FURNITURE

CROSS-REFERENCE TO RELATED APPLICATION

This application claims benefit of, and priority to, U.S. Provisional Patent Application Ser. No. 63/455,307, filed Mar. 29, 2023, the entire contents of which are hereby incorporated by reference.

BACKGROUND

1. Technical Field

The present disclosure relates to furniture and, more specifically, to drawer interlock systems for furniture which may reduce tip over of the furniture.

2. Discussion of Related Art

There is a rising concern with furniture tipping over when weight is applied to the front of the furniture. In particular, there is a concern that when a drawer of the furniture is open, weight in or applied to the drawer may cause the furniture to tip over. For example, a child may hang or climb on the open drawer such that the weight of the child causes the furniture to tip over. When the furniture tips over, the furniture may land on the child in front of or on the furniture causing injury to the child or other person on or in front of the furniture.

There is a continuing need for systems to prevent or reduce the possibility of furniture tipping over as a result of a weight, such as a child, in or on the end of an open drawer.

SUMMARY

This disclosure relates generally to drawer interlock systems that prevent the drawers of a piece of furniture from opening until a support strap is secured. The support strap secured to prevent the piece of furniture from tipping over. The support strap attached to a locking device of each drawer of the piece of furniture to transition the locking device from a locked state to an unlocked state. In the locked state of the locking device, a respective drawer is prevented from opening and in the unlocked state of the locking device, a respective drawer is allowed to move from a fully closed position towards an open position.

In an aspect of the present disclosure, a drawer locking system includes a support strap, a lock plate, and a lock hook. The lock plate is configured to mount to a locking rail of a piece of furniture. A lock hook is pivotally mounted to the lock plate and includes a body that has a first end portion and a second end portion. The lock hook has a locked configuration in which the first end portion is configured to engage a drawer to prevent the drawer from moving from a closed position towards an open position thereof. The lock hook has an unlocked configuration in which the first end portion is configured to disengage the drawer to allow the drawer to move from the closed position towards the open position. The second end portion is engaged with the support strap such that the support strap pivots the lock hook from the locked configuration to the unlocked configuration.

In aspects, the support strap is configured to secure to structure to support the piece of furniture. The support strap may pivot the second end portion downward to pivot the lock hook from the locked configuration to the unlocked configuration.

In some aspects, the drawer locking stem includes a biasing member that is configured to urge the lock hook towards the locked configuration. The biasing member may be secured to the first end portion of the lock hook. The lock plate may include amount. The biasing member may have a first end secured to the mount and a second end secured to the first end portion of the lock hook. The lock plate may include a stop. The stop may be configured to engage the second end portion to prevent over pivoting of the second end portion beyond the unlocked configuration. The lock plate may be of monolithic construction with the stop and the mount bent from in plane with the rest of the lock plate.

In certain aspects, the first end portion of the lock hook includes an arm that extends from the body to a hook. The hook may be configured to engage an inside surface of a rear of the drawer in the locked configuration of the lock hook to prevent the drawer from moving from the closed position.

In particular aspects, the drawer locking system includes a strap clamp that is secured to the second end portion. The strap clamp may secure the support strap to the second end portion.

In another aspect of the present disclosure, a piece of furniture includes a frame, a locking rail, a first drawer, a second drawer, a first drawer locking system, and a second drawer locking system. The locking rail is secured to the frame. The first drawer is slidably supported in the frame and has an open position and a closed position. The first drawer having a back end that is positioned adjacent the locking rail in the closed position. The second drawer slidably supported in the frame. The second drawer has an open position and a closed position. The second drawer has a back end that is positioned adjacent the locking rail in the closed position. The first drawer locking system and the second drawer locking system may be any of the drawer locking systems disclosed herein. The lock plate of the first drawer locking system is mounted to the locking rail behind the back end of the first drawer. The lock hook engages the back end of the first drawer in the locked configuration to prevent the first drawer from sliding from the closed position. The lock plate of the second drawer locking system is mounted to the locking rail behind the back end of the second drawer. The lock hook engages the back end of the second drawer to prevent the second drawer from sling from the closed position. The support strap of the first drawer locking system and the support strap of the second locking system form a single continuous support strap such that the single continuous support strap transitions the first drawer locking system and the second drawer locking system from the locked configuration to the unlocked configuration in concert with one another.

In aspects, the frame includes a base positioned below the first drawer and the second drawer. The base may be configured to be spaced apart from a support surface of the piece of furniture. The single continuous support strap may be configured to secure to the support surface or a wall below the base such that the first drawer locking system and the second drawer locking system are each transitioned to the unlocked configuration.

In another aspect of the present disclosure, a drawer interlock system for a piece of furniture including a first drawer, a second drawer, and a locking rail secured adjacent a back end of each of the first drawer and the second drawer includes a support strap, a first lock plate, a second lock plate, a first lock hook, and a second lock hook. The first lock plate is configured to mount to the locking rail adjacent the back end of the first drawer. The second lock plate is configured to mount to the locking rail adjacent the back end of the second drawer. The first lock hook is pivotally mounted to the first lock plate. The first lock hook includes a body that has a first end portion and a second end portion. The first lock hook has a locked configuration in which the first end portion of the first lock hook is configured to engage the back end of the first drawer to prevent the first drawer from moving from a closed position towards an open portion thereof. The first lock hook has an unlocked configuration in which the first end portion of the first lock hook is configured to disengage the first drawer to allow the first drawer to move from the closed position towards the open position. The second lock hook is pivotally mounted to the second lock plate. The second lock hook incudes a body that has a first end portion and a second end portion. The second lock hook has a locked configuration in which the first end portion of the second lock hook is configured to engage the second drawer to prevent the second drawer from moving from a closed position towards an open position thereof. The second lock hook has an unlocked configuration in which the first end portion of the second lock hook is configured to disengage the second drawer to allow the second drawer to move from the closed position towards the open position. The second end portion of the first lock hook and the second end portion of the second lock hook are each engaged with the support strap such that the support strap pivots the first lock hook and the second lock hook from the locked configuration to the unlocked configuration in concert with one another.

In aspects, downward movement of the support strap transition the first lock hook and the second lock hook from the locked configuration to the unlocked configuration.

In some aspects, the drawer interlock system includes a first biasing member disposed between the first lock plate and the first lock hook. The first biasing member may urge the first lock hook towards the locked configuration. The first biasing member may urge the support strap upwards.

In certain aspects, the first lock plate includes a first stop. The first stop may be configured to engage the second end portion of the first lock hook to prevent over pivoting of the second end portion of the first lock hook beyond the unlocked configuration.

In another aspect of the present disclosure, a piece of furniture includes a frame, a locking rail secured to the frame, a first drawer, a second drawer, and a drawer interlock system. The first drawer is slidably supported in the frame and has an open position and a closed position. The first drawer has a back end that is positioned adjacent the locking rail in the closed position. The second drawer is slidably supported in the frame and has an open position and a closed position. The second drawer has aback end that is positioned adjacent the locking rail in the closed position. The drawer interlock system may be any drawer interlock system disclosed herein. The first lock plate is mounted to the locking rail adjacent the back end of the first drawer when the first drawer is in the closed position such that the first lock hook engages the back end of the first drawer when the first drawer is in the closed position and the first lock hook is in the locked configuration. The second lock plate mounted to the locking rail adjacent the back end of the second drawer when the second drawer is in the closed position such that the second lock hook engages the back end of the second drawer when the second drawer is in the closed position and the second lock hook is in the locked configuration.

In another aspect of the present disclosure, a method of securing a piece of furniture from tipping includes positioning the piece of furniture in a desired location. The method also includes securing a securement plate to a wall or a support surface adjacent a back side of the piece of furniture and below a frame of the piece of furniture. Securing the securement plate may include transitioning a first lock hook and a second lock hook of a drawer interlock system from a locked configuration in which a first drawer associated with the first lock hook and a second drawer associated with the second lock hook are prevented from sliding from a closed position to an unlocked configuration in which the first drawer and the second drawer are each capable of sliding from the closed position towards an open position.

In aspects, securing the securement plate includes tensioning the securement strap that extends between the securement plate and the frame of the piece of furniture such that the securement strap transition the first lock hook and the second lock hook from the locked configuration to the unlocked configuration in response to tensioning of the securement strap.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein.

DETAILED DESCRIPTION

Figure 1:
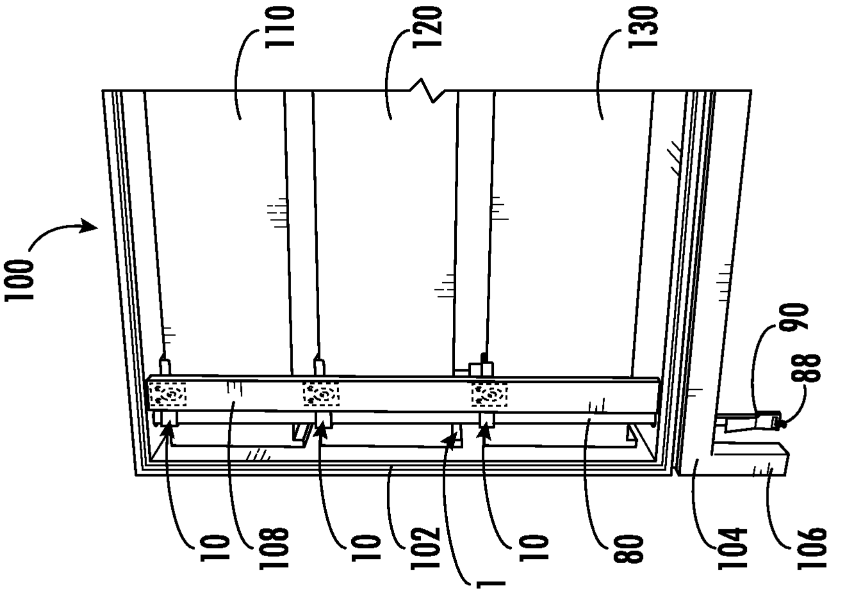
FIG. 1 is a rear view of a piece of furniture including a drawer interlock system provided in accordance with the present disclosure in a locked state.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

This disclosure is directed generally to a drawer interlock device that prevents the drawers of a piece of furniture from opening until a support strap of the drawer interlock device is secured to a fixed structure such as the floor or the wall. The support strap prevents or substantially reduces the possibility of the piece of furniture from tipping over, e.g., tipping forward.

Figure 2:
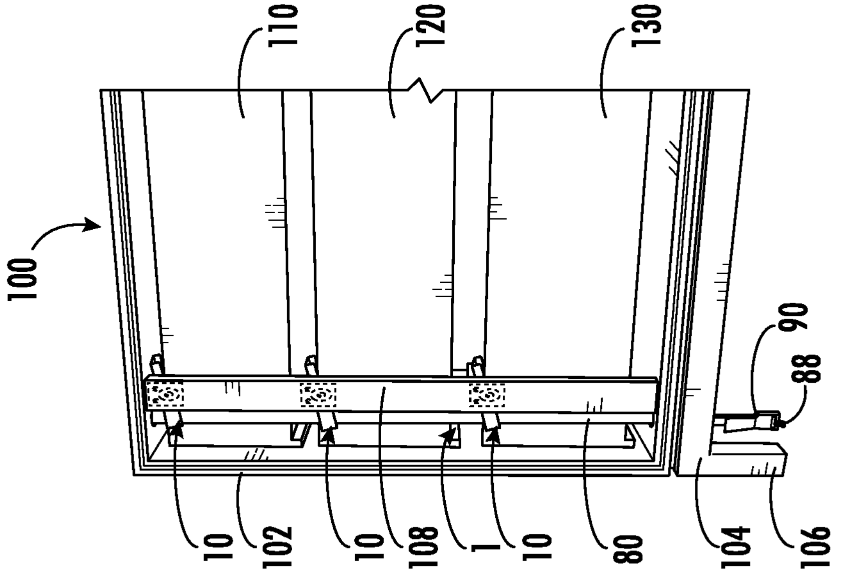
FIG. 2 is a rear view of the piece of furniture of FIG. 1 with the drawer interlock system in an unlocked state.
Figure 3:
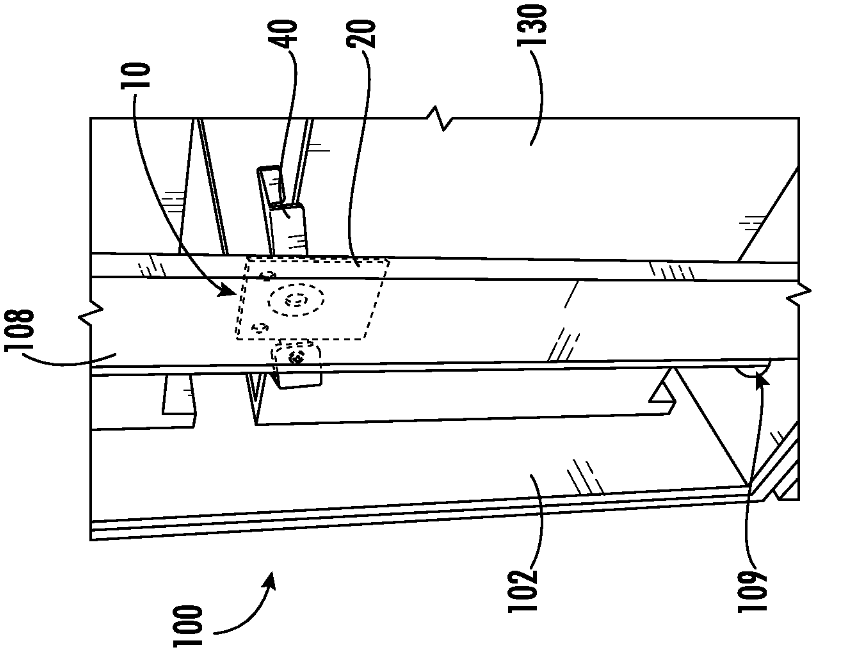
FIG. 3 is an enlarged rear view of the piece of furniture of FIG. 2.
Figure 4:
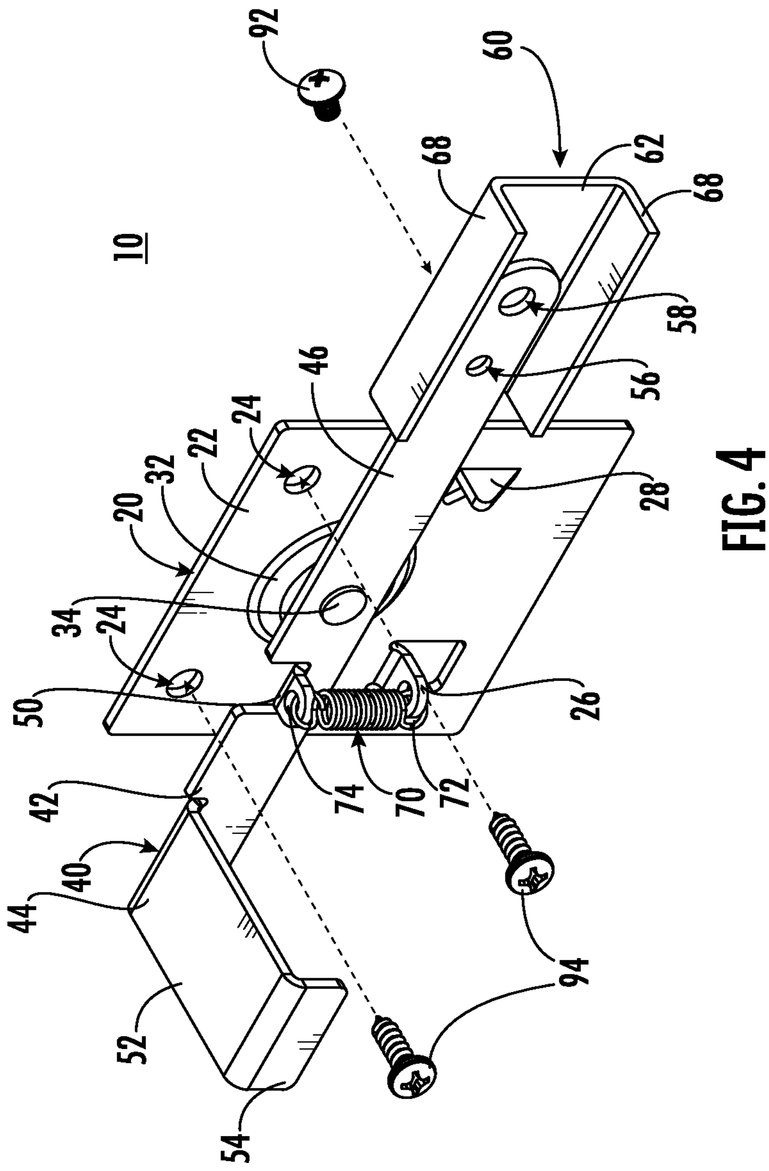
FIG. 4 is a front perspective view of a drawer interlock device of the drawer interlock system of FIG. 1.
Figure 5:
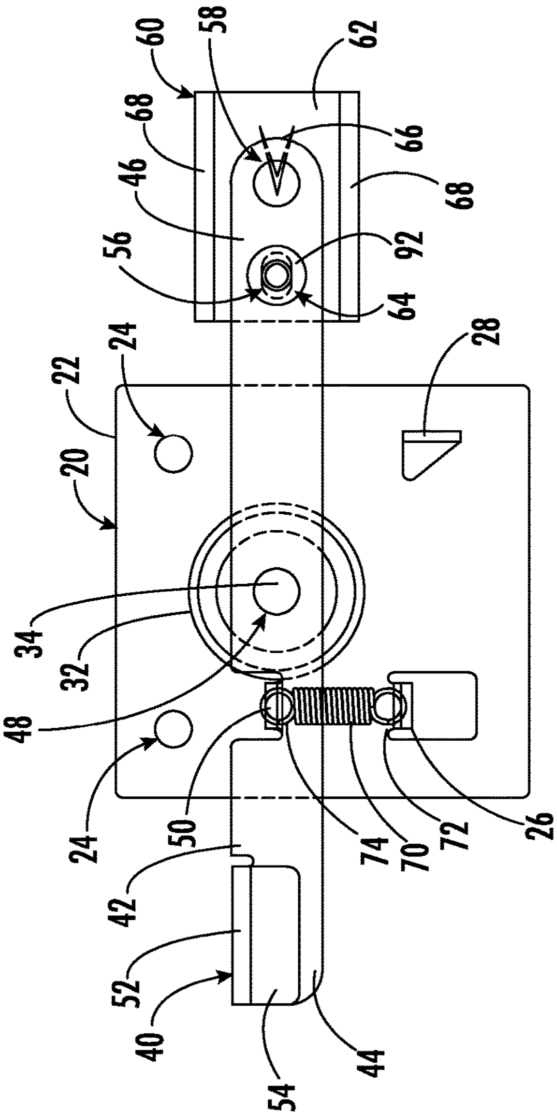
FIG. 5 is a front view of the drawer interlock device of FIG. 4.
Figure 6:
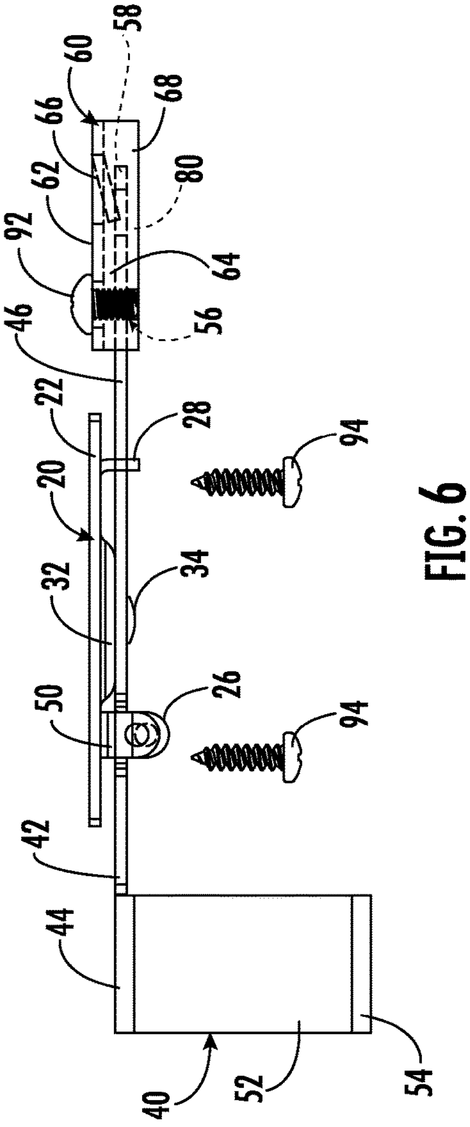
FIG. 6 is a top view of the drawer interlock device of FIG. 4.

Referring now to FIGS. 1-3, a drawer interlock system 1 is provided in accordance with the present disclosure installed on a piece of furniture 100. The piece of furniture 100 includes a frame 102, a base 104, and may include one or more legs 106. The piece of furniture 100 also includes a locking rail 108 secured to the frame 102 and drawers 110, 120, 130. Each of the drawers 110, 120, 130 has a closed position in which a back of the respective drawer 110, 120, 130 is adjacent to or in contact with the locking rail 108 and an open position in which a back of the respective drawer 110, 120, 130 is spaced apart from the locking rail 108. In the open position, the respective drawer 110, 120, 130 is open to allow access to an interior of the respective drawer 110, 120, 130.

With particular reference to FIG. 1, the drawer interlock system 1 includes one or more drawer interlock devices 10, and a support strap 80. The support strap 80 includes a securement plate 88 that is securable to structure around the piece of furniture 100. When the drawer interlock system 1 is in the locked state, the support strap 80 is unsecured to structure and each of the drawer interlock devices 10 are in a locked configuration in which each of the drawers 110, 120, 130 is prevented from moving from the closed position towards an open position. In some embodiments, the drawer interlock devices 10 may allow a drawer to move from an open position to the closed position when the respective drawer interlock device 10 is in the locked configuration.

Referring now to FIGS. 2 and 3, the drawer interlock system 1 has an unlocked state in which the securement plate 88 of the support strap 80 is secured to structure such that each of the drawer interlock devices 10 are in an unlocked configuration in which each of the drawers 110, 120, 130 are allowed to move from the closed position towards an open position thereof. As shown in FIG. 3, when in the unlocked configuration, a lock hook 40 of the drawer interlock device 10 is pivoted upward to release a back of the drawer 130 to allow the drawer 130 to move towards the open position. In certain embodiments, the frame 102 may include a strap passage 109 that allows the support strap 80 to extend through the frame 102 adjacent the locking rail 108. The strap passage 109 may be circular, elliptical, rectangular, or any shape to allow the support strap 80 to pass through.

With reference to FIGS. 3-6, the drawer interlock device 10 is described in accordance with the present disclosure. The drawer interlock device 10 includes a lock plate 20, a lock hook 40, a strap clamp 60, and a biasing member 70. The lock plate 20 is secured to the locking rail 108 to attach the drawer interlock device 10 to the piece of furniture 100. The lock plate 20 is positioned such that the lock hook 40 is rotatable about the lock plate 20 between the locked configuration and the unlocked configuration as described below. The lock hook 40 is positioned to capture a back of a respective drawer in the locked configuration and to release the back of the respective drawer in the unlocked configuration. The strap clamp 60 is secured to the lock hook 40 with a portion of the support strap 80 disposed therebetween such that the lock hook 40 is fixed to the portion of the support strap 80 by the strap clamp 60. The biasing member 70 has a first end portion 72 attached to the lock plate 20 and a second end portion 74 attached to the lock hook 40 such that the biasing member 70 urges the lock hook 40 towards the locked configuration.

Figure 7:
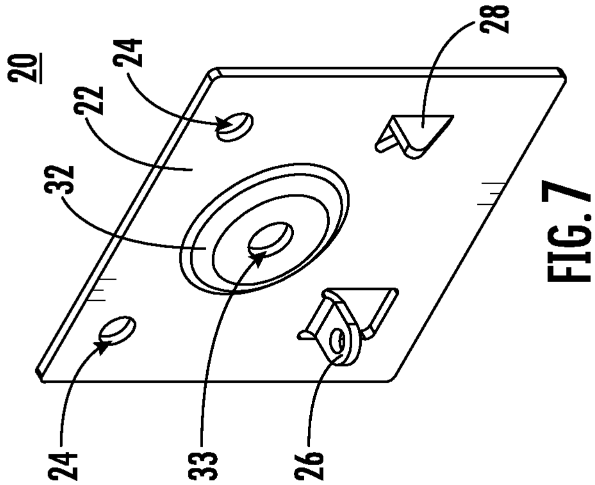
FIG. 7 is a front perspective view of a lock plate of the drawer interlock device of FIG. 4.

With additional reference to FIG. 7, the lock plate 20 includes a mounting plate 22, a ring mount 26, a stop 28, and a boss 32. The mounting plate 22 includes mounting holes 24 defined therethrough that are sized and dimensioned to receive fasteners 94 to secure the mounting plate 22 to the locking rail 108. The ring mount 26 extends forward from the mounting plate 22 and is configured to support the biasing member 70. The ring mount 26 and/or the stop 28 may be a portion of the mounting plate 22 that is cut from the mounting plate 22 and bent forward to extend from the mounting plate 22 such that the ring mount 26 and/or the stop 28 is out of plane with the remainder of the mounting plate 22. The ring mount 26 and/or the stop 28 may be bent at a right angle to the mounting plate 22.

The boss 32 extends forward from the mounting plate 22 and may be circular in shape. The boss 32 defines a pivot hole 33 therethrough that receives a pivot pin 34 therethrough. The pivot pin 34 may secure the lock hook 40 to the lock plate 20. The boss 32 may extend forward from the mounting plate 22 to prevent the lock hook 40 from contacting the mounting plate 22. The stop 28 may limit rotation of the lock hook 40 about the pivot pin 34 when transitioned to the unlocked configuration.

Figure 8:
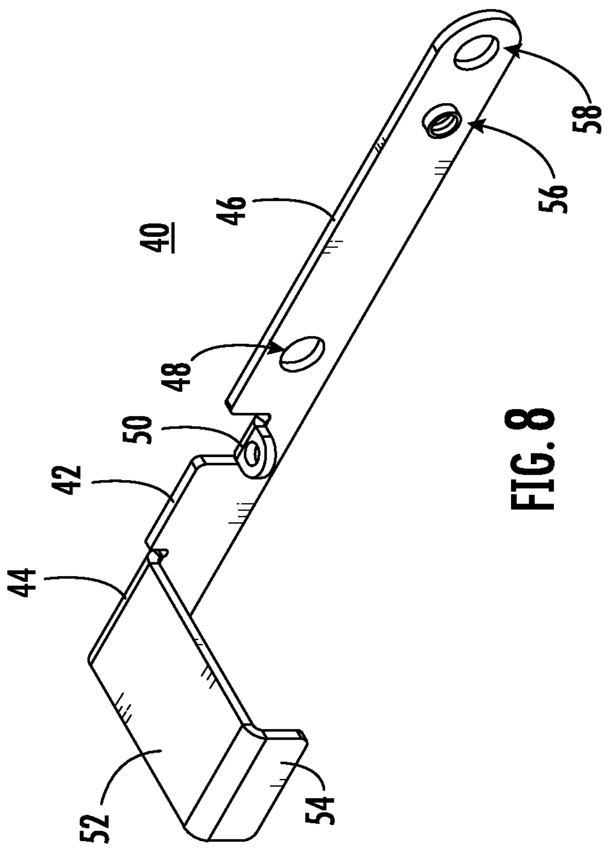
FIG. 8 is a front perspective view of a lock hook of the drawer interlock device of FIG. 4.

Referring now to FIG. 8, the lock hook 40 includes a body 42 that extends between a first end portion 44 and a second end portion 46 thereof. The body 42 includes a pivot opening 48 that extends through the body 42 between the first end portion 44 and the second end portion 46. The pivot opening 48 receives the pivot pin 34 therethrough to rotatably secure the lock hook 40 relative to the lock plate 20.

The first end portion 44 includes an arm 52 that extends forward from the body 42 which terminates in a hook 54 that engages the back of a respective drawer to prevent the drawer from moving from the closed position towards to the open position when the lock hook 40 is in the locked configuration. The first end portion 44 of the body 42 includes a ring mount 50 that extends forward from the body 42 and is configured to receive a portion of the biasing member 70. The ring mount 50 may be positioned between the pivot opening 48 and the first end portion 44. The second end portion 46 includes a threaded hole 56 and may include a clamp opening 58 defined therethrough. The first end portion 44 may engage the ring mount 26 of the lock plate 20 to limit rotation of the lock hook 40 about the pivot opening 48 in the locked configuration. The second end portion 46 may engage the stop 28 in the unlocked configuration to limit rotation of the lock hook 40 about the pivot opening 48.

When the biasing member 70 is connected to the ring mount 50 of the lock hook 40 and the ring mount 26 of the lock plate 20, the biasing member 70 biases the lock hook 40 towards the locked configuration. The biasing member 70 may be a coil spring that is extended when the lock hook 40 is rotated towards the unlocked configuration such that the biasing member 70 resists the rotation of the lock hook 70 towards the unlocked configuration.

Figure 9:
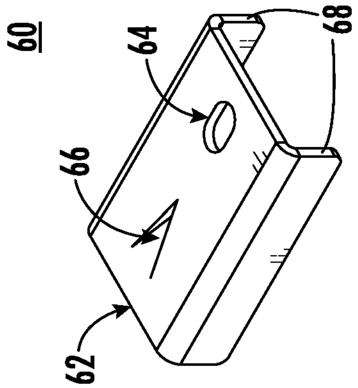
FIG. 9 is a back perspective view of a strap clamp of the drawer interlock device of FIG. 4.

With reference to FIG. 9, the strap clamp 60 includes a clamp body 62 and clamp walls 68 that extend forward from opposite ends of the clamp body 62. The clamp body 62 includes a slot 64 defined therethrough. The clamp body 62 also includes a strap clip 66 that extends forward from the clamp body 62. The strap clip 66 may be cut from the clamp body 62 and bent forward. The strap clip 66 may engage the support strap 80 when the support strap 80 is received within the strap clamp 60.

The strap clamp 60 is secured to the second end portion 46 of the lock hook 40 by a fastener 92 that passes through the slot 64 and is threaded into the threaded hole 56. When the support strap 80 is received within the strap clamp 60, the support strap 80 passes forward of the clamp walls 68 and is captured between the clamp body 62 and the lock hook 40 with the clamp walls 68 urging the support strap 80 into the lock hook 40. The support strap 80 may be seated in the strap clip 66 to prevent the support strap 80 from moving away from the lock hook 40. The support strap 80 may be positioned between the fastener 92 and the strap clip 66. A portion of the strap clip 66 may be received in the clamp opening 58 when the strap clamp 60 is secured to the lock hook 40. When the strap clamp 60 is secured to the lock hook 40 such the support strap 80 is fixed to the lock hook 40, the support strap 80 transitions the lock hook 40 from the locked configuration to the unlocked configuration as detailed below.

Figure 10:
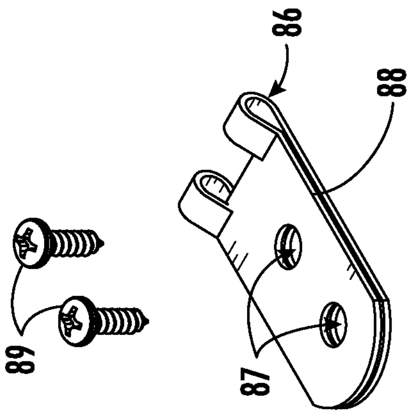
FIG. 10 is a perspective view of a securement plate of the support strap of the drawer interlock system of FIG. 2.
Figure 11:
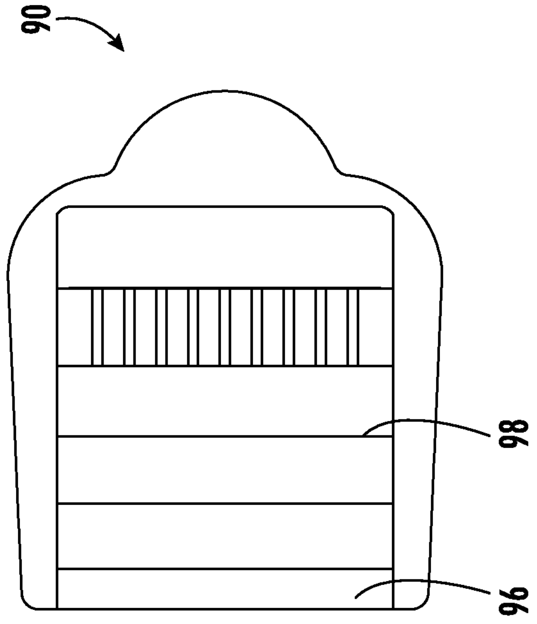
FIG. 11 is front view of a strap buckle of the drawer interlock system of FIG. 2.

Referring now to FIGS. 10 and 11, the securement plate 88 and the buckle 90 of the support strap 80 (FIG. 1) are described in detail. The securement plate 88 includes one or more openings 87 that extend through the securement plate 88. The openings 87 are sized and dimensioned to receive the fasteners 89 that secure the securement plate 88 to a structure. The securement plate 88 includes strap connectors 86 that define a passage to couple the securement plate 88 to the support strap 80. The structure may be a floor or surface that the piece of furniture rests or a portion of a wall such as a base board or stud of the wall. The structure needs to be sufficient to resist the tip over of the piece of furniture when the securement plate 88 is secured to the structure.

The support strap 80 may include a buckle 90 that receives the support strap 80 about the buckle member 98. The buckle 90 may include a plate rod 96 that is received in the strap connectors 86 of the securement plate 88. The buckle 90 may allow for adjustment of a length of the support strap 80 such that when the securement plate 88 is secured to the structure, the support strap 80 pulls downward on each of the lock hooks 40 to transition each of the drawer interlock devices 10 to the unlocked configurations thereof.

Referring back to FIGS. 1-3, a method of preventing a piece of furniture from tipping over is described in accordance with the present disclosure with reference to the piece of furniture 100 and the drawer interlock system 1. The method includes securing a drawer interlock system 1 to the piece of furniture 100. Securing the drawer interlock system 1 to the piece of furniture 100 may include fixing a locking rail 108 to the frame 102 of the piece of furniture 100 such that the locking rail 108 extends vertically and is adjacent the rear of the drawers 110, 120, 130 when the drawers 110, 120, 130 are in the closed position. Securing the drawer interlock system 1 may include mounting drawer interlock devices 10 to the locking rail 108 adjacent the back of each drawer 110, 120, 130 such that when the lock hooks 40 are in the locked configuration, the lock hooks 40 engage the back of the drawers 110, 120, 130 to prevent movement of the drawers 110, 120, 130 from the closed position towards the open position thereof.

The method includes positioning the piece of furniture 100 with the drawer interlock system 1 in position within a room of a building. With the piece of furniture 100 positioned, the support strap 80 of the drawer interlock system 1 is secured to structure. Securing the support strap 80 includes securing the securement plate 88 of the support strap 80 to the structure. In some embodiments, the structure may be the floor or a portion of a wall below the drawers of the piece of furniture. The structure may be a baseboard, a stud, flooring, or a floorboard. The structure should be sufficient to resist tipping of the furniture. When the securement plate 88 is secured to the structure, the support strap 80 may rotate each of the lock hooks 40 from the locked configuration to the unlocked configuration such that the drawers 110, 120, 130 of the drawer interlock devices 10 are movable from the closed position towards the unlocked positions thereof. In some embodiments, after securing the securement plate 88 to the structure, the support strap 80 may be tightened using the buckle 90 to transition the drawer interlock devices 10 to the unlocked configurations.

The drawer interlock systems 1 detailed herein may be used to prevent pieces of furniture from tipping over when the drawer interlock systems 1 are secured to structure. In addition, when the drawer interlock systems 1 are not secured to structure, the drawers of the furniture are prevented from opening to reduce or prevent the possibility of the furniture tipping over.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A piece of furniture comprising:

a frame including a base, the base configured to be spaced apart from a support surface of the piece of furniture;

a locking rail secured to the frame;

a first drawer slidably supported in the frame, the first drawer having an open position and a closed position, the first drawer having a back end positioned adjacent the locking rail in the closed position;

a second drawer slidably supported in the frame, the second drawer having an open position and a closed position, the second drawer having a back end positioned adjacent the locking rail in the closed position;

a single continuous support strap;

a first drawer locking system comprising:

a first lock plate mounted to the locking rail, the first lock plate including a first stop; and a first lock hook pivotally mounted to the first lock plate, the first lock hook comprising a first body having a first end portion and a second end portion, the first lock hook having a locked configuration in which the first end portion is configured to engage the first drawer to prevent the first drawer from moving from a closed position towards an open position thereof, the first lock hook having an unlocked configuration in which the first end portion is configured to disengage the first drawer to allow the first drawer to move from the closed position towards the open position, the second end portion engaged with the support strap such that the support strap pivots the first lock hook from the locked configuration to the unlocked configuration, the first stop of the first lock plate configured to engage the second end portion to prevent over pivoting of the second end portion beyond the unlocked configuration;

wherein the first lock plate of the first drawer locking system is mounted to the locking rail behind the back end of the first drawer, the first lock hook engaged with the back end of the first drawer in the locked configuration to prevent the first drawer from sliding from the closed position; and a second drawer locking system comprising:

a second lock plate mounted to a locking rail, the lock plate including a second stop; and a second lock hook pivotally mounted to the second lock plate, the second lock hook comprising a second body having a first end portion and a second end portion, the second lock hook having a locked configuration in which the first end portion is configured to engage the second drawer of a piece of furniture to prevent the second drawer from moving from a closed position towards an open position thereof, the second lock hook having an unlocked configuration in which the first end portion is configured to disengage the second drawer to allow the second drawer to move from the closed position towards the open position, the second end portion engaged with the support strap such that the support strap pivots the second lock hook from the locked configuration to the unlocked configuration, the second stop of the second lock plate configured to engage the second end portion to prevent over pivoting of the second end portion beyond the unlocked configuration;

wherein the second lock plate of the second drawer locking system mounted to the locking rail behind the back end of the second drawer, the second lock hook engaged with the back end of the second drawer in the locked configuration to prevent the second drawer from sliding from the closed position, the support strap forming the single continuous support strap such that the single continuous support strap transitions the first drawer locking system and the second drawer locking system from the locked configuration to the unlocked configuration in concert with one another, the base of the frame positioned below the first drawer and the second drawer, the single continuous support strap configured to secure to the support surface or a wall below the base such that the first drawer locking system and the second drawer locking system are each transitioned to the unlocked configuration.

2. The piece of furniture according to claim 1, further comprising a biasing member configured to urge the first lock hook towards the locked configuration.

3. The piece of furniture according to claim 2, wherein the biasing member is secured to the first end portion of the first lock hook.

4. The piece of furniture according to claim 3, wherein the first lock plate includes a mount, the biasing member having a first end secured to the mount and a second end secured to the first end portion of the first lock hook.

5. The piece of furniture according to claim 4, wherein the first lock plate is of monolithic construction with the first stop and the mount bent from in plane with the rest of the first lock plate.

6. The piece of furniture according to claim 1, wherein the first end portion of the first lock hook includes an arm that extends from the first body to a hook, the hook configured to engage an inside surface of a rear of the first drawer in the locked configuration of the first lock hook to prevent the first drawer from moving from the closed position.

7. The piece of furniture according to claim 1, further comprising a strap clamp secured to the second end portion of the first body, the strap clamp securing the support strap to the second end portion of the first body.

8. A drawer interlock system for a piece of furniture including a first drawer, a second drawer, and a locking rail secured adjacent a back end of each of the first drawer and the second drawer, the drawer interlock system comprising:

a support strap;

a first lock plate configured to mount to the locking rail adjacent the back end of the first drawer;

a second lock plate configured to mount to the locking rail adjacent the back end of the second drawer;

a first lock hook pivotally mounted to the first lock plate, the first lock hook comprising a body having a first end portion and a second end portion, the first lock hook having a locked configuration in which the first end portion of the first lock hook is configured to engage the back end of the first drawer to prevent the first drawer from moving from a closed position towards an open position thereof, the first lock hook having an unlocked configuration in which the first end portion of the first lock hook is configured to disengage the first drawer to allow the first drawer to move from the closed position towards the open position, the first lock plate including a first stop, the first stop configured to engage the second end portion of the first lock hook to prevent over pivoting of the second end portion of the first lock hook beyond the unlocked configuration; and a second lock hook pivotally mounted to the second lock plate, the second lock hook comprising a body having a first end portion and a second end portion, the second lock hook having a locked configuration in which the first end portion of the second lock hook is configured to engage the second drawer to prevent the second drawer from moving from a closed position towards an open position thereof, the second lock hook having an unlocked configuration in which the first end portion of the second lock hook is configured to disengage the second drawer to allow the second drawer to move from the closed position towards the open position, the second end portion of the first lock hook and the second end portion of the second lock hook each engaged with the support strap such that the support strap pivots the first lock hook and the second lock hook from the locked configuration to the unlocked configuration in concert with one another.

9. The drawer interlock system according to claim 8, wherein downward movement of the support strap transitions the first lock hook and the second lock hook from the locked configuration to the unlocked configuration.

10. The drawer interlock system according to claim 8, further comprising a first biasing member disposed between the first lock plate and the first lock hook, the first biasing member urging the first lock hook towards the locked configuration.

11. The drawer interlock system according to claim 10, wherein the first biasing member urges the support strap upwards.

12. A piece of furniture comprising:

a frame;

a locking rail secured to the frame;

a first drawer slidably supported in the frame, the first drawer having an open position and a closed position, the first drawer having a back end positioned adjacent the locking rail in the closed position;

a second drawer slidably supported in the frame, the second drawer having an open position and a closed position, the second drawer having a back end positioned adjacent the locking rail in the closed position; and a drawer interlock system according to claim 8, wherein the first lock plate is mounted to the locking rail adjacent the back end of the first drawer when the first drawer is in the closed position such that the first lock hook engages the back end of the first drawer when the first drawer is in the closed position and the first lock hook is in the locked configuration, the second lock plate mounted to the locking rail adjacent the back end of the second drawer when the second drawer is in the closed position such that the second lock hook engages the back end of the second drawer when the second drawer is in the closed position and the second lock hook is in the locked configuration.

* * * * *